United States Patent
Ishii et al.

(10) Patent No.: US 7,494,105 B2
(45) Date of Patent: Feb. 24, 2009

(54) ANTISLIP RUBBER MEMBER FOR SUPPORT

(75) Inventors: Hiroki Ishii, Daito (JP); Masuo Ogawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 433 days.

(21) Appl. No.: 11/331,075

(22) Filed: Jan. 13, 2006

(65) Prior Publication Data

US 2006/0231701 A1    Oct. 19, 2006

(30) Foreign Application Priority Data

Jan. 14, 2005   (JP)   ................ 2005-000106

(51) Int. Cl.
*F16M 13/00* (2006.01)
(52) U.S. Cl. .................. 248/615; 248/188.1; 248/918
(58) Field of Classification Search ......... 248/917–923, 248/615, 638, 188.8, 188.9; 62/295
See application file for complete search history.

(56) References Cited

U.S. PATENT DOCUMENTS

| | | | | | |
|---|---|---|---|---|---|
| 2,458,621 | A | * | 1/1949 | Miller | 16/42 T |
| 3,575,288 | A | * | 4/1971 | Brucken | 206/320 |
| 4,640,479 | A | * | 2/1987 | Shely et al. | 248/56 |
| 4,718,631 | A | * | 1/1988 | Reynolds et al. | 248/615 |
| 5,088,669 | A | * | 2/1992 | Zinnbauer | 248/188.9 |
| 5,871,199 | A | * | 2/1999 | Koike et al. | 248/638 |

FOREIGN PATENT DOCUMENTS

JP         01-297944         12/1989

* cited by examiner

*Primary Examiner*—Amy J. Sterling
(74) *Attorney, Agent, or Firm*—Crowell & Moring LLP

(57) ABSTRACT

This antislip rubber member for a support comprises a fit portion fitted into a mounting hole of a support supporting a display, a stop portion preventing the fit portion from slipping off the mounting hole of the support and a pull portion pulled in a direction for fitting the fit portion into the mounting hole of the support thereby fitting the fit portion into the mounting hole of the support. The pull portion includes a rib portion, slender in plan view, arranged to extend in the longitudinal direction of the stop portion.

14 Claims, 9 Drawing Sheets

ANTISLIP RUBBER MEMBER FOR SUPPORT

BACKGROUND OF THE INVENTION

1. Field of the Invention

The present invention relates to an antislip rubber member for a support, and more particularly, it relates to an antislip rubber member for a support employed for a display such as a liquid crystal television.

2. Description of the Background Art

An antislip rubber base provided on a portion of an apparatus such as a display or an electronic apparatus coming into contact with a set surface is known in general. For example, Japanese Patent Laying-Open No. 1-297944 (1989) discloses such an antislip rubber base.

The aforementioned Japanese Patent Laying-Open No. 1-297944 discloses an antislip rubber base for a portable carphone provided with a shaft portion (fit portion) fitted into a fixing hole (fitting hole) provided on the base plate of an apparatus and a discoidal stop portion for inhibiting the shaft portion from slipping off the fitting hole (mounting hole).

A structure formed by mounting an antislip rubber member on the bottom portion of a stand (support) supporting a liquid crystal television employed as an exemplary display is also known in general. FIG. 9 is a side elevational view showing the overall structure of a liquid crystal television 150 comprising exemplary conventional antislip rubber members 110 for a stand 130. FIG. 10 is a rear elevational view of the stand 130 provided with the exemplary conventional antislip rubber members 10 mounted on the liquid crystal television 150 shown in FIG. 10. FIGS. 11 to 17 illustrate the details of the structure of the exemplary conventional antislip rubber members 110 for the stand 130 shown in FIG. 9. The structure of the exemplary conventional antislip rubber members 110 is now described with reference to FIGS. 9 to 17.

The stand 130 provided with the exemplary conventional antislip rubber members 110 supports the liquid crystal television 150, as shown in FIGS. 9 and 10.

The liquid crystal television 150 is constituted of a front cabinet 151, a liquid crystal display unit 152 mounted on the front cabinet 151 and a rear cabinet 153 constituting a housing along with the front cabinet 151, as shown in FIG. 9.

As shown in FIG. 9, the stand 130 includes a base member 131 mounted on the back surface 153a of the rear cabinet 153 and a rotatable member 132 rotatably mounted on the base member 131. The base member 131 is provided with a shaft portion 131a rotatably mounted with the rotatable member 132 and threaded holes 131b for screwing the base member 131 to the back surface 153a of the rear cabinet 153 (see FIG. 9), as shown in FIGS. 10 and 11. The rotatable member 132 includes a reinforcing rib portion 132a provided on the back surface thereof in the form of a lattice and mounting holes 132b provided on the bottom portion thereof for mounting the antislip rubber members 110.

As shown in FIG. 12, each antislip rubber member 110 mounted on the rotatable member 132 includes a fit portion 111, a stop portion 112, a pull portion 113 and a contact portion 114. The fit portion 110 is fitted into the corresponding mounting hole 132b of the rotatable member 132, as shown in FIG. 15. The stop portion 112 has a function of preventing the fit portion 111 from slipping off the mounting hole 132b of the rotatable member 132 when downward force F2 is applied to the antislip rubber member 110 as shown in FIG. 16. The stop portion 112 is tapered along a direction (Z2 in FIGS. 13 and 15) for fitting the fit portion 111 into the mounting hole 132b of the rotatable member 132. The upper surface 112a of the stop portion 112 has ends 112b extending in the longitudinal direction (X2 in FIG. 14), as shown in FIG. 14. The pull portion 113 is provided for pulling the fit portion 111 in a direction (Z2 in FIG. 15) for fitting the fit portion 111 into the mounting hole 132b of the rotatable member 132. The contact portion 114 has a function of inhibiting the rotatable member 132 of the stand 130 supporting the liquid crystal television 150 from misregistration (slipping) by coming into contact with a set surface 170, as shown in FIGS. 9 and 15. This contact portion 114 has a contact surface 114a coming into contact with the set surface 170 and an upper surface 114b, as shown in FIG. 15. The contact portion 114 is so arranged that the longitudinal centerlines L3 and L4 of the contact portion 114 and the stop portion 112 align with each other in plan view, as shown in FIG. 14.

When the force F2 (see FIGS. 16 and 17) is applied to the conventional antislip rubber member 110 mounted on the stand 130 of the liquid crystal television 150 shown in FIGS. 9 to 17, both longitudinal ends 112b (along the direction X2 in FIGS. 16 and 17) of the stop portion 112 of the antislip rubber member 110 are disadvantageously easily bent upward. When receiving the force F2, therefore, the stop portion 112 of the antislip rubber member 110 is disadvantageously easily displaced from the mounting hole 132b of the rotatable member 132 of the stand (support 130) as shown in FIG. 17.

In the antislip rubber base disclosed in the aforementioned Japanese Patent Laying-Open No. 1-297944, the thickness of the outer peripheral portion of the lower end of the discoidal stop portion is so small that the outer peripheral portion of the lower end of the discoidal stop portion is disadvantageously easily bent upward when downward force is applied to the antislip rubber base. Therefore, the stop portion of the antislip rubber base is disadvantageously easily displaced from a fixing hole (mounting hole).

SUMMARY OF THE INVENTION

The present invention has been proposed in order to solve the aforementioned problems, and an object of the present invention is to provide an antislip rubber member for a support capable of inhibiting a stop portion from slipping off a mounting hole.

In order to attain the aforementioned object, an antislip rubber member for a support according to a first aspect of the present invention comprises a fit portion fitted into a mounting hole of a support supporting a display, a stop portion preventing the fit portion from slipping off the mounting hole of the support, a pull portion pulled in a direction for fitting the fit portion into the mounting hole of the support thereby fitting the fit portion into the mounting hole of the support and a contact portion coming into contact with a set surface thereby inhibiting the support supporting the display from misregistration, and the pull portion includes a rib portion, slender in plan view, arranged to extend in the longitudinal direction of the stop portion.

In the antislip rubber member for a support according to the first aspect of the present invention, as hereinabove described, the rib portion slender in plan view and arranged to extend in the longitudinal direction of the stop portion is so provided on the pull portion that the same can inhibit a longitudinal end of the stop portion from upward displacement, whereby the fit portion can be inhibited from slipping off the mounting hole of the support due to upward deformation of the longitudinal end of the stop portion. Further, the slender rib portion extending in the longitudinal direction of the stop portion is so provided on the pull portion that the longitudinally extending slender rib portion is easily graspable when the fit portion is fitted into the mounting hole of the support, whereby the pull portion can be more easily pulled. Thus, the fit portion can be more easily fitted into the mounting hole of the support.

In the aforementioned antislip rubber member for a support according to the first aspect, the rib portion of the pull portion is preferably arranged to extend toward a portion close to a longitudinal end of the upper surface of the stop portion. According to this structure, the longitudinal end of the stop portion can be more inhibited from upward deformation, whereby the stop portion can be more effectively inhibited from slipping off the mounting hole of the support due to upward deformation of the longitudinal end of the stop portion.

In the aforementioned antislip rubber member for a support according to the first aspect, the rib portion preferably has a thickness smaller than the short-side width of the fit portion. According to this structure, the rib portion can be easily inserted into the mounting hole of the support having a width at least equivalent to that of the fit portion, whereby the fit portion can be easily fitted into the mounting hole of the support by pulling the inserted rib portion.

In the aforementioned antislip rubber member for a support according to the first aspect, the rib portion is preferably provided on a centerline extending in the longitudinal direction of the stop portion. According to this structure, the rib portion can be provided on the center of a portion close to the longitudinal end of the stop portion, whereby the longitudinal end of the stop portion can be uniformly inhibited from upward deformation.

In the aforementioned antislip rubber member for a support according to the first aspect, the rib portion may have a vertical length larger than the vertical length of the stop portion.

In the aforementioned antislip rubber member for a support according to the first aspect, the pull portion preferably further includes a projecting portion integrally provided with the rib portion to project from a side surface of the rib portion in the short-side direction of the stop portion in plan view. According to this structure, a short-side end of the stop portion can also be inhibited from upward deformation through the projecting portion, whereby the fit portion can be inhibited from slipping off the mounting hole of the support due to upward deformation of the short-side end of the stop portion. Further, the bond area between the pull portion and the stop portion is increased due to the projecting portion provided on the pull portion in addition to the rib portion, whereby tearing of the pull portion can be suppressed when the fit portion is fitted into the mounting hole of the support by pulling the pull portion upward.

In the aforementioned antislip rubber member for a support including the projecting portion, a pair of projecting portions are preferably provided on the pull portion to project from both side surfaces of the rib portion in the short-side direction of the stop portion. According to this structure, the short-side end of the stop portion can be more inhibited from upward deformation and tearing of the pull portion can be more effectively suppressed due to the pair of projecting portions, as compared with a case of providing only one projecting portion.

In the aforementioned antislip rubber member for a support including the projecting portion, the projecting portion of the pull portion is preferably provided on a centerline extending in the short-side direction of the stop portion. According to this structure, the projecting portion projecting in the short-side direction is provided around the center of the stop portion easily deformed upward, whereby the short-side end of the stop portion can be further inhibited from upward deformation.

In the aforementioned antislip rubber member for a support according to the first aspect, the mounting hole of the support is preferably provided with a recess portion partially storing the upper surface of the contact portion, and the fit portion is preferably so arranged as to locate the longitudinal centerline of the fit portion on a position separated from the longitudinal centerline of the contact portion at a prescribed interval toward the surface of the support in plan view. According to this structure, the upper surface of the contact portion can be inhibited from observableness. In this case, the distance between the outer side surface of the fit portion and that of the contact portion closer to the surface of the support can be reduced by arranging the longitudinal centerline of the fit portion at the prescribed interval from the longitudinal centerline of the contact portion toward the surface of the support. Thus, the quantity of deformation of the portion located between the outer side surfaces of the fit portion and the contact portion can be reduced when the contact portion is deformed with respect to the centerline of the fit portion in a direction bending the upper surface of the contact portion closer to the surface of the support downward. Consequently, the upper surface of the contact portion closer to the surface of the support can be further inhibited from observableness through the side of the surface of the support.

An antislip rubber member for a support according to a second aspect of the present invention comprises a fit portion fitted into a mounting hole of a support supporting a liquid crystal display, a stop portion preventing the fit portion from slipping off the mounting hole of the support, a pull portion pulled in a direction for fitting the fit portion into the mounting hole of the support thereby fitting the fit portion into the mounting hole of the support and a contact portion coming into contact with a set surface thereby inhibiting the support supporting the liquid crystal television from misregistration. The pull portion includes a rib portion, slender in plan view, arranged to extend toward a portion close to a longitudinal end of the upper surface of the stop portion, the pull portion includes a projecting portion integrally provided with the rib portion to project from a side surface of the rib portion in the short-side direction of the stop portion in plan view, the mounting hole of the support is provided with a recess portion partially storing the upper surface of the contact portion, and the fit portion is so arranged as to locate the longitudinal centerline of the fit portion on a position separated from the longitudinal centerline of the contact portion at a prescribed interval toward the surface of the support in plan view.

In the antislip rubber member for a support according to the second aspect of the present invention, as hereinabove described, the rib portion slender in plan view and arranged to extend in the longitudinal direction of the stop portion is so provided on the pull portion that the same can inhibit a longitudinal end of the stop portion from upward displacement, whereby the fit portion can be inhibited from slipping off the mounting hole of the support due to upward deformation of the longitudinal end of the stop portion. Further, the slender rib portion extending in the longitudinal direction of the stop portion is so provided on the pull portion that the longitudinally extending slender rib portion is easily graspable when the fit portion is fitted into the mounting hole of the support, whereby the pull portion can be more easily pulled. Thus, the fit portion can be more easily fitted into the mounting hole of the support.

According to the second aspect, the rib portion of the pull portion is arranged to extend toward the portion close to the longitudinal end of the upper surface of the stop portion so that the longitudinal end of the stop portion can be further inhibited from upward deformation, whereby the fit portion can be more effectively inhibited from slipping off the mounting hole of the support due to upward deformation of the longitudinal end of the stop portion. The projecting portion projecting in the short-side direction of the stop portion from the side surface of the rib portion is so provided on the pull portion that the short-side end of the stop portion can also be inhibited from upward deformation through the projecting portion, whereby the fit portion can be inhibited from slipping off the mounting hole of the support due to upward deformation of the short-side end of the stop portion. Further, the bond area between the pull portion and the stop portion is increased due to the projecting portion provided on the pull portion in addition to the rib portion, whereby tearing of the pull portion can be suppressed when the fit portion is fitted into the mounting hole of the support by pulling the pull portion upward. In addition, the recess portion partially storing the upper surface of the contact portion is so provided on the mounting hole of the support that the upper surface of the contact portion can be inhibited from observableness. In this case, the distance between the outer side surface of the fit portion and that of the contact portion closer to the surface of the support can be reduced by arranging the longitudinal centerline of the fit portion at the prescribed interval from the longitudinal centerline of the contact portion toward the surface of the support. Thus, the quantity of deformation of the portion located between the outer side surfaces of the fit portion and the contact portion can be reduced when the contact portion is deformed with respect to the centerline of the fit portion in a direction bending the upper surface of the contact portion closer to the surface of the support downward. Consequently, the upper surface of the contact portion closer to the surface of the support can be further inhibited from observableness through the side of the surface of the support.

In the aforementioned antislip rubber member for a support according to the second aspect, the rib portion preferably has a thickness smaller than the short-side width of the fit portion. According to this structure, the rib portion can be easily inserted into the mounting hole of the support having a width at least equivalent to that of the fit portion, whereby the fit portion can be easily fitted into the mounting hole of the support by pulling the inserted rib portion.

In the aforementioned antislip rubber member for a support according to the second aspect, the rib portion is preferably provided on a centerline extending in the longitudinal direction of the stop portion. According to this structure, the rib portion can be provided on the center of a portion close to the longitudinal end of the stop portion, whereby the longitudinal end of the stop portion can be uniformly inhibited from upward deformation.

In the aforementioned antislip rubber member for a support according to the second aspect, the rib portion may have a vertical length larger than the vertical length of the stop portion.

In the aforementioned antislip rubber member for a support according to the second aspect, a pair of projecting portions are preferably provided on the pull portion to project from both side surfaces of the rib portion in the short-side direction of the stop portion. According to this structure, the short-side end of the stop portion can be more inhibited from upward deformation and tearing of the pull portion can be more effectively suppressed due to the pair of projecting portions, as compared with a case of providing only one projecting portion.

In the aforementioned antislip rubber member for a support according to the second aspect, the projecting portion of the pull portion is preferably provided on a centerline extending in the short-side direction of the stop portion. According to this structure, the projecting portion projecting in the short-side direction is provided around the center of the stop portion easily deformed upward, whereby the short-side end of the stop portion can be further inhibited from upward deformation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of an antislip rubber member 10 for a stand (support) according to the embodiment of the present invention is described with reference to FIGS. 1 to 8.

Figure 1:
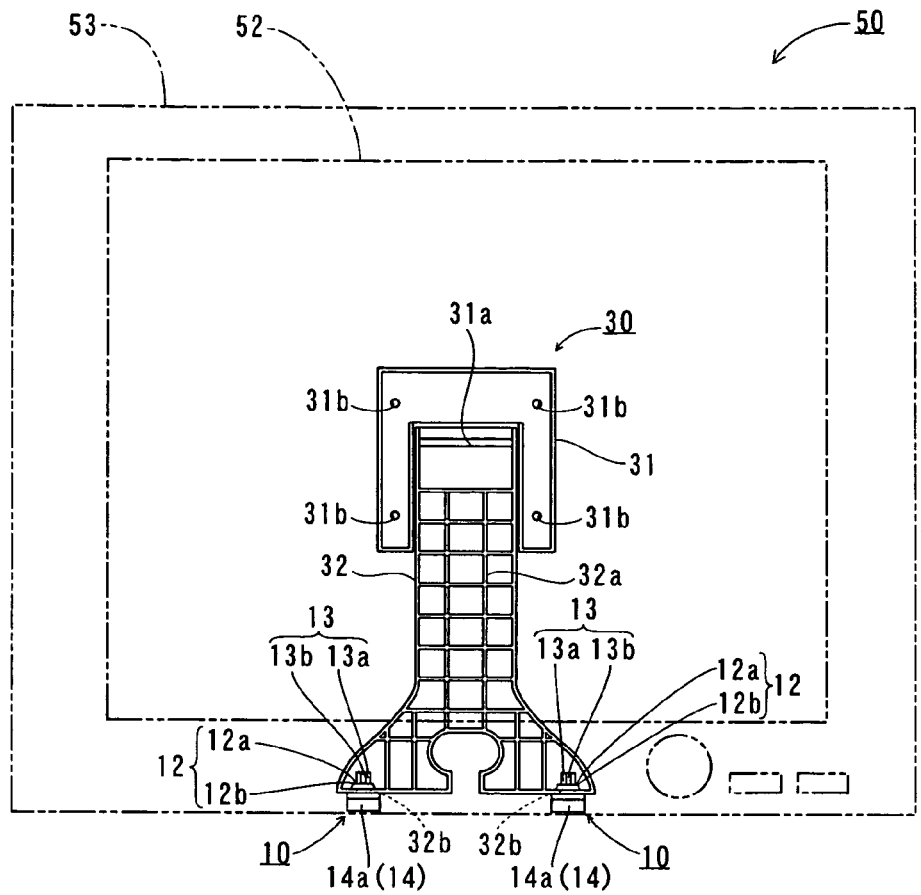
FIG. 1 is a rear elevational view of a stand (support) including antislip rubber members according to an embodiment of the present invention mounted on a liquid crystal television.
Figure 2:
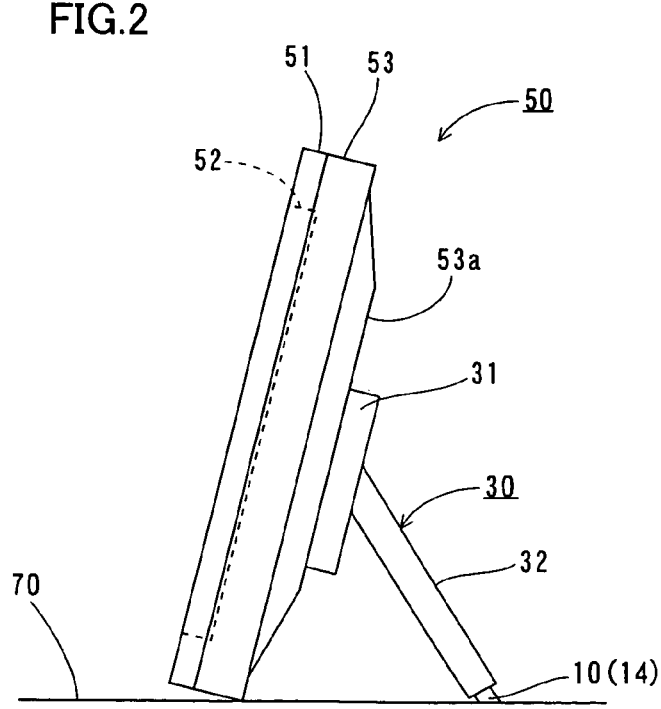
FIG. 2 is a side elevational view of the liquid crystal television comprising the antislip rubber members for a stand according to the embodiment shown in FIG. 1.
Figure 3:
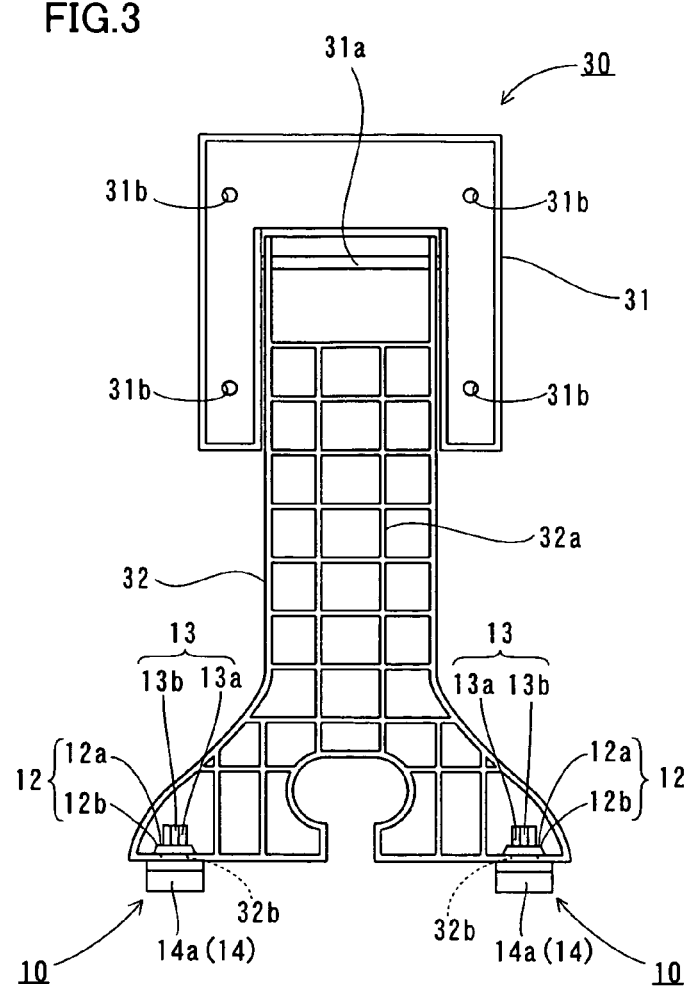
FIG. 3 is a rear elevational view of the stand mounted with the antislip rubber members for a stand according to the embodiment shown in FIG. 1.

As shown in FIGS. 1 and 2, a stand 30 mounted with antislip rubber members 10 of silicone rubber or the like according to the embodiment of the present invention supports a liquid crystal television 50. The stand 30 is an example of the "support" in the present invention.

As shown in FIG. 2, the liquid crystal television 50 is constituted of a front cabinet 51, a liquid crystal display unit 52 mounted on the front cabinet 51 and a rear cabinet 53 constituting a housing along with the front cabinet 51.

The stand 30 includes a base member 31 mounted on the back surface 53a of the rear cabinet 53 and a rotatable member 32 rotatably mounted on the base member 31, as shown in FIG. 2. The base member 31 is provided with a shaft portion 31a rotatably mounted with the rotatable member 32 and threaded holes 31b for screwing the base member 31 to the back surface 53a of the rear cabinet 53 (see FIG. 2). The rotatable member 32 includes a reinforcing rib portion 32a provided on the back surface in the form of a lattice and mounting holes 32b provided on the bottom portion for receiving the antislip rubber members 10 respectively. The rotatable member 32 is further provided on portions formed with the mounting holes 32b with recess portions 32c for partially storing the upper surfaces 14a of contact portions 14 of the antislip rubber members 10.

Figure 4:
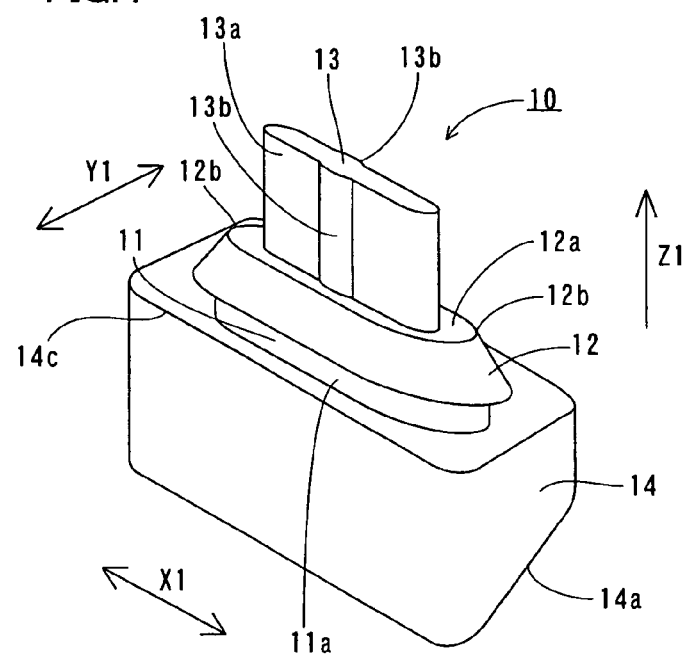
FIG. 4 is a perspective view showing each antislip rubber member for a stand according to the embodiment shown in FIG. 1.
Figure 5:
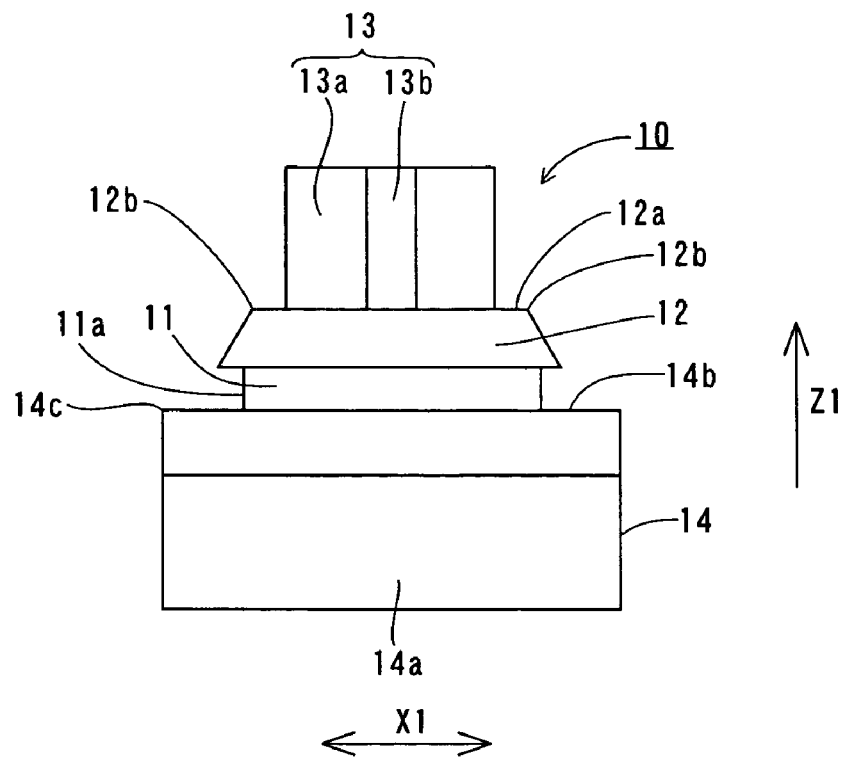
FIG. 5 is a front elevational view showing the antislip rubber member for a stand according to the embodiment shown in FIG. 1.
Figure 6:
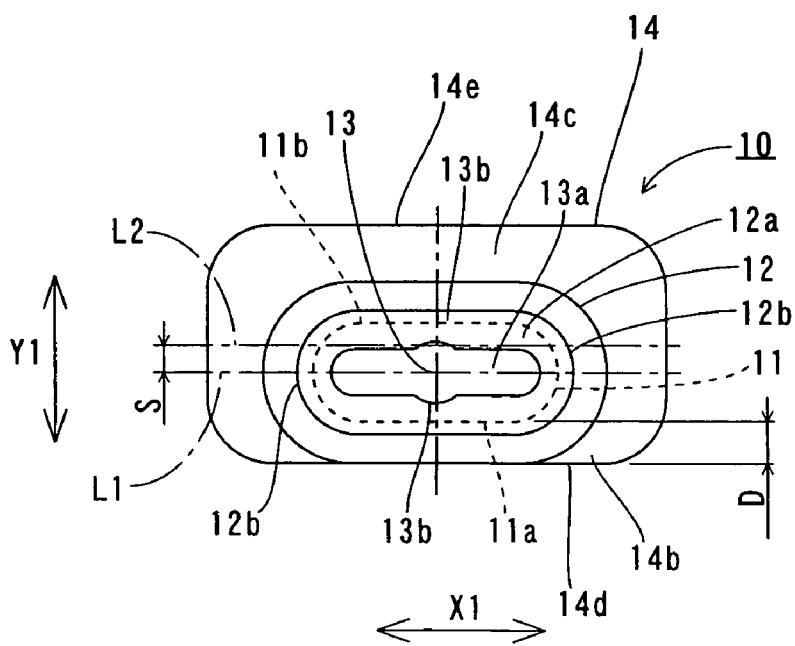
FIG. 6 is a plan view showing the antislip rubber member for a stand according to the embodiment shown in FIG. 1.
Figure 7:
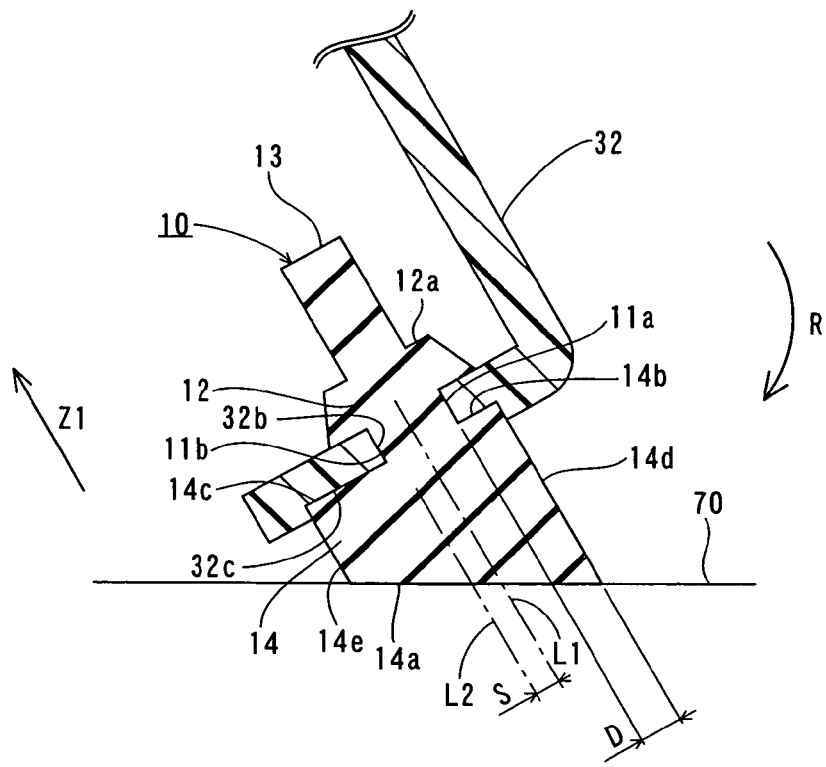
FIG. 7 is a sectional view showing the antislip rubber member for a stand according to the embodiment shown in FIG. 1.
Figure 8:
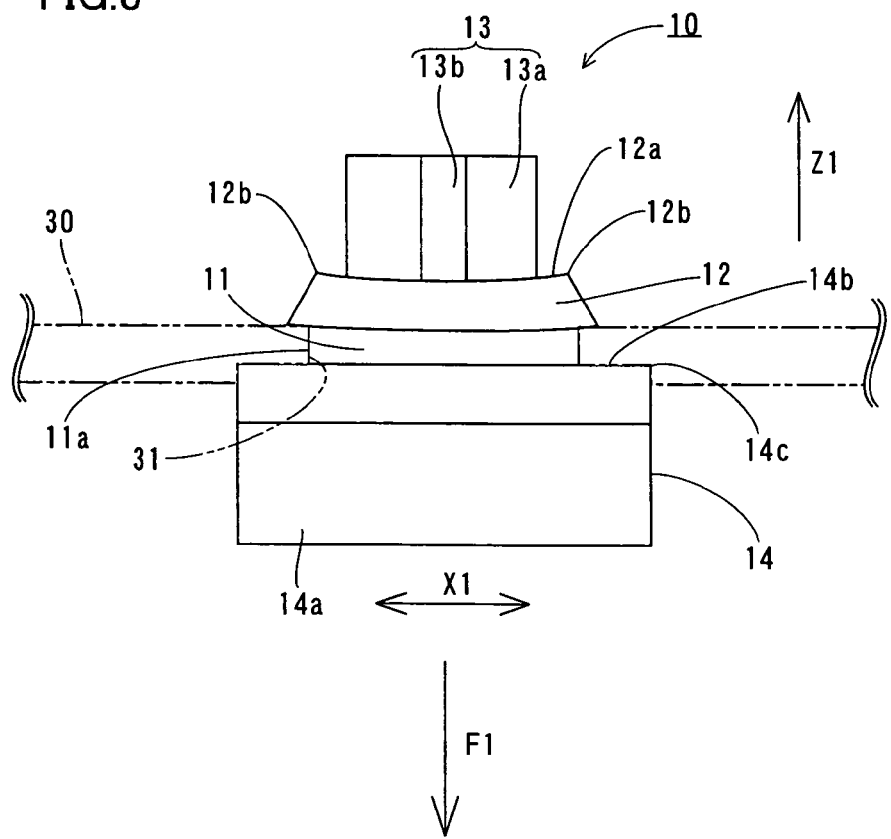
FIG. 8 is a front elevational view for illustrating a state of applying force to the antislip rubber member for a stand according to the embodiment shown in FIG. 1.
Figure 9:
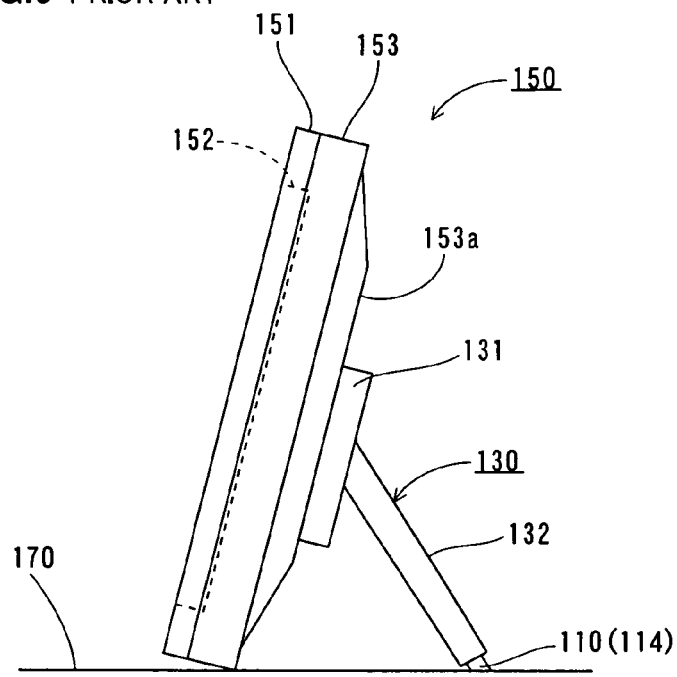
FIG. 9 is a side elevational view showing the overall structure of a liquid crystal television comprising exemplary conventional antislip rubber members for a stand.
Figure 10:
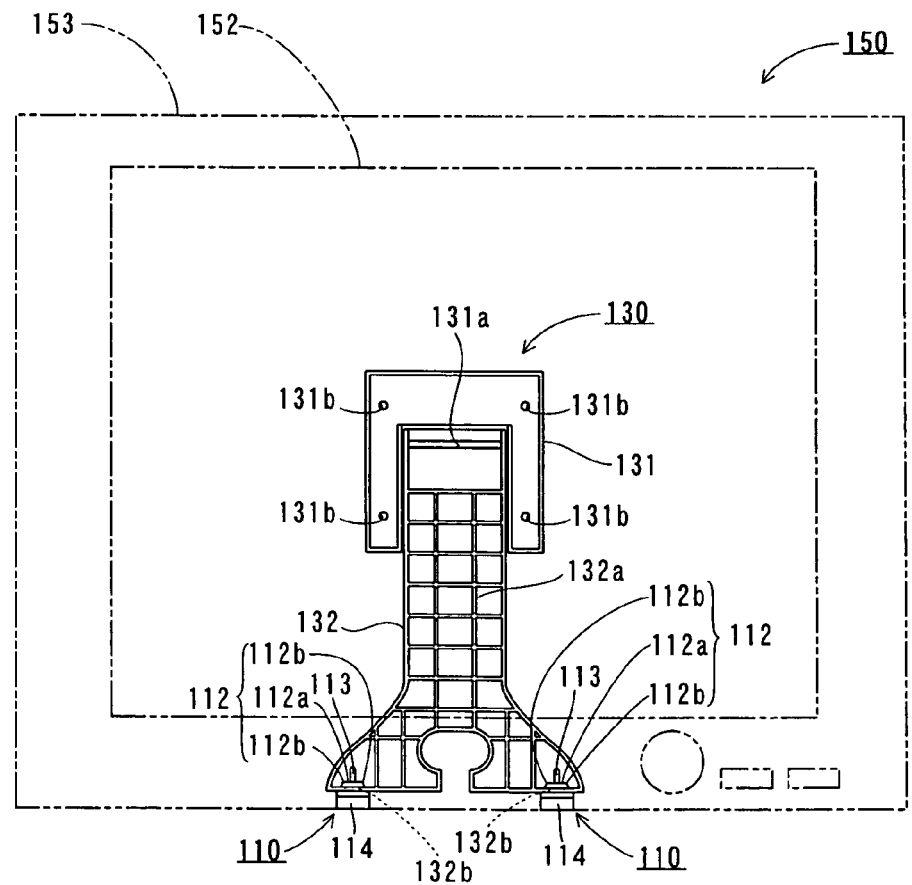
FIG. 10 is a rear elevational view of a stand provided with the exemplary conventional antislip rubber members mounted on the liquid crystal television shown in FIG. 9.
Figure 11:
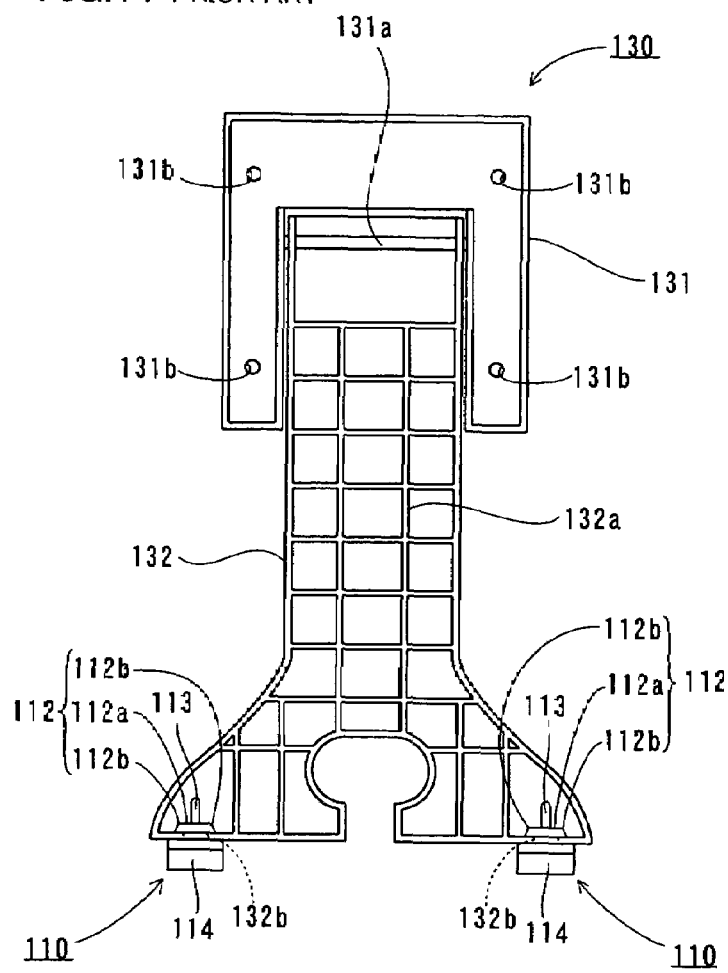
FIG. 11 is a rear elevational view of the stand provided with the exemplary conventional antislip rubber members for a stand shown in FIG. 9.
Figure 12:
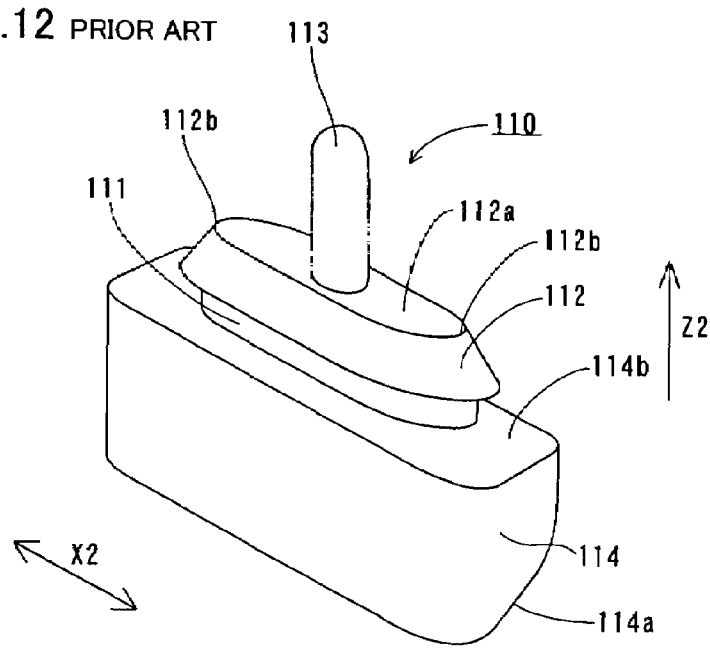
FIG. 12 is a perspective view showing each exemplary conventional antislip rubber member for a stand shown in FIG. 9.
Figure 13:
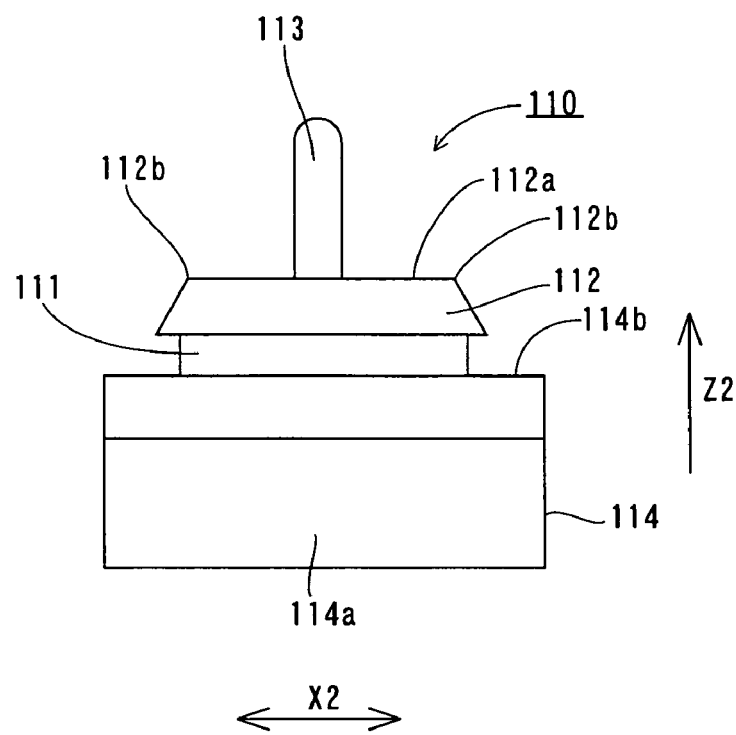
FIG. 13 is a front elevational view showing the exemplary conventional antislip rubber member for a stand shown in FIG. 9.
Figure 14:
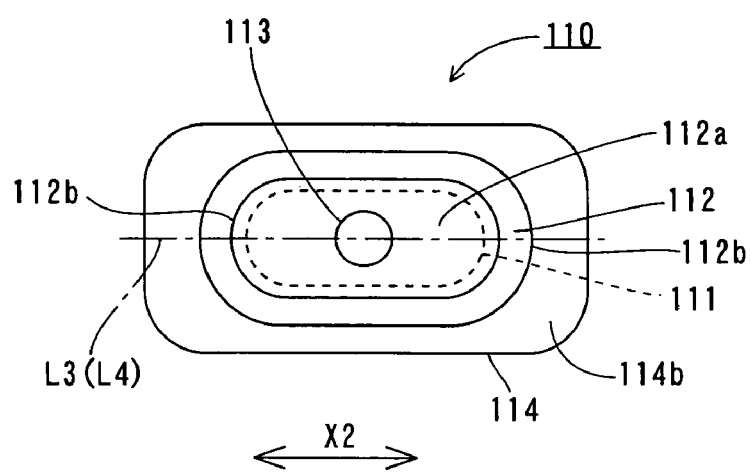
FIG. 14 is a plan view showing the exemplary conventional antislip rubber member for a stand shown in FIG. 9.
Figure 15:
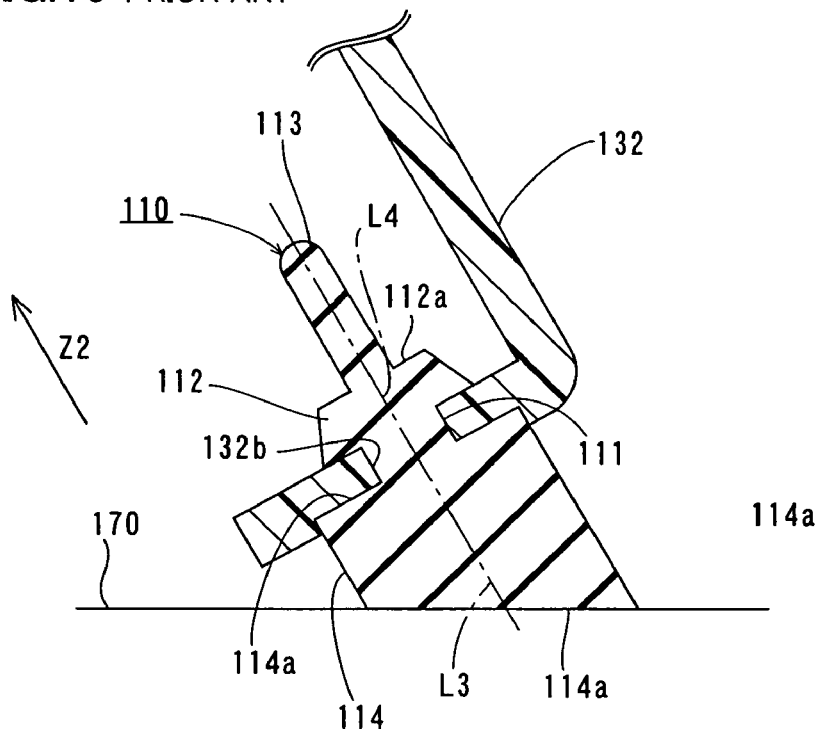
FIG. 15 is a sectional view showing the exemplary conventional antislip rubber member for a stand shown in FIG. 9.
Figure 16:
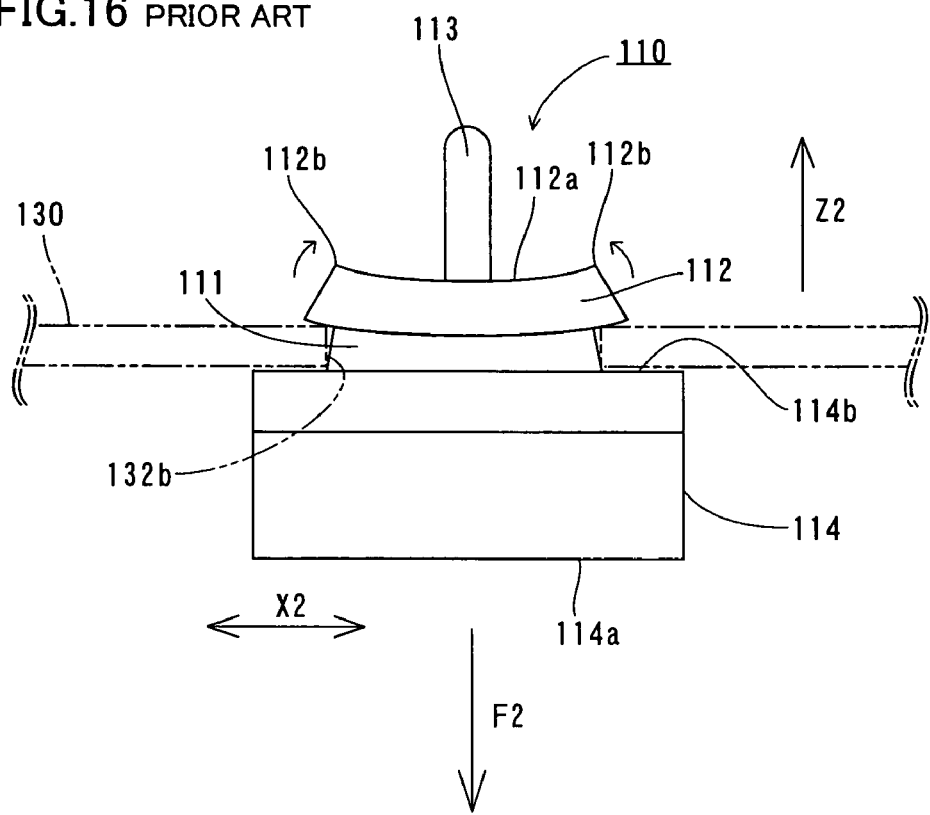
FIGS. 16 and 17 are front elevational views for illustrating a state of applying force to the exemplary conventional antislip rubber member for a stand shown in FIG. 9.
Figure 17:
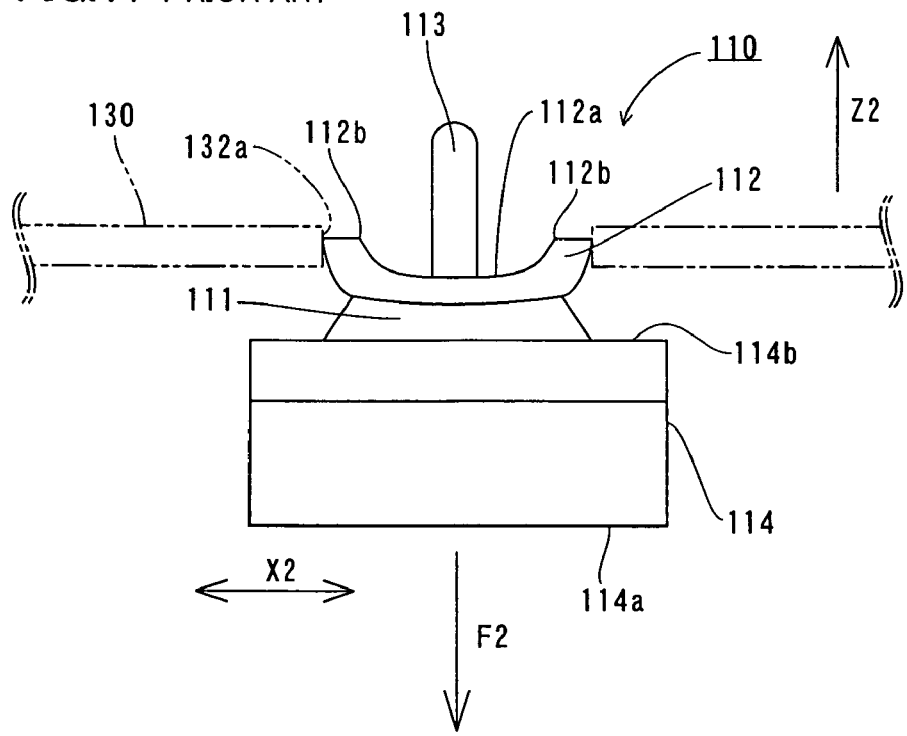

As shown in FIG. 4, each antislip rubber member 10 mounted on the rotatable member 32 includes a fit portion 11, a stop portion 12, a pull portion 13 and the contact portion 14. The fit portion 11 is fitted into the corresponding mounting hole 32b of the rotatable member 32, as shown in FIG. 7. Further, the fit portion 11 is so arranged that the longitudinal centerline L1 thereof is located on a position separated from the longitudinal centerline L2 of the contact portion 14 by an interval S, as shown in FIGS. 6 and 7. This fit portion 11 has an outer side surface 11a and an inner side surface 11b. The stop portion 12 has a function of preventing the fit portion 11 from slipping off the mounting hole 32b of the stand 30 when force F1 is applied to the antislip rubber member 10, as shown in FIG. 8. This stop portion 12 is tapered along a direction (Z1 in FIG. 5) for fitting the fit portion 11 into the mounting hole 32b of the rotatable member 32. In other words, the stop portion 12 of the antislip rubber member 10 has a trapezoidal shape, as shown in FIG. 5. The upper surface 12a of the stop portion 12 has ends 12b extending in the longitudinal direction (X1 in FIG. 6) thereof, as shown in FIG. 6. The pull portion 13 is provided for pulling the fit portion 11 in the Z1 direction (Z1 in FIGS. 7 and 8) for fitting the same into the mounting hole 32b of the rotatable member 32.

According to this embodiment, the pull portion 13 of the antislip rubber member 10 is provided with a rib portion 13a, slender in plan view, arranged to extend toward portions close to the ends 12b of the stop portion 12, as shown in FIG. 4. This rib portion 13a has a thickness smaller than the short-side width of the fit portion 11. Thus, the rib portion 13a can be easily inserted into the mounting hole 32b of the rotatable member 32 having a width at least equivalent to that of the fit portion 11, so that the fit portion 11 can be easily fitted into the mounting hole 32b of the rotatable member 32 by pulling the rib portion 13a inserted into the mounting hole 32b. The rib portion 13a is provided on a centerline extending in the longitudinal direction of the stop portion 12. Further, the rib portion 13a has a vertical length larger than that of the stop portion 12.

The rib portion 13a of the pull portion 13 is integrally provided with a pair of projecting portions 13b projecting from both side surfaces of the rib portion 13a in the short-side direction (Y1 in FIG. 4) of the stop portion 12. The projecting portions 13b project from portions close to the longitudinal centers of the side surfaces of the rib portion 13a in the short-side direction of the stop portion 12. These projecting portions 13b are provided on a centerline extending in the short-side direction of the stop portion 12.

The contact portion 14 has a function of inhibiting the rotatable member 32 of the stand 30 supporting the liquid crystal television 50 from misregistration (slipping) by coming into contact with a set surface 70, as shown in FIGS. 2 and 7. This contact portion 14 has a contact surface 14a coming into contact with the set surface 70, an outer upper surface 14b, an inner upper surface 14c, an outer side surface 14d and an inner side surface 14e, as shown in FIG. 7.

According to this embodiment, as hereinabove described, the rib portion 13a slender in plan view and arranged to extend in the longitudinal direction (X1 in FIG. 4) of the stop portion 12 is so provided that the ends 12b of the stop portion 12 in the longitudinal direction (X1 in FIG. 4) thereof can be inhibited from upward deformation through the rib portion 13a, whereby the fit portion 11 of the antislip rubber member 10 can be inhibited from slipping off the mounting hole 32b of the rotatable member 32 due to upward deformation of the ends 12b of the stop portion 12 in the longitudinal direction (X1 in FIG. 4) thereof. Further, the pull portion 13 is provided with the slender rib portion 13a extending in the longitudinal direction (X1 in FIG. 4) of the stop portion 12 so that the slender rib portion 13a extending in the longitudinal direction (X1 in FIG. 4) is easily graspable when the fit portion 11 is fitted into the mounting hole 32b of the rotatable member 32, whereby the pull portion 13 can be more easily pulled. Thus, the fit portion 11 can be more easily fitted into the mounting hole 32b of the rotatable member 32.

According to this embodiment, the rib portion 13a of the pull portion 13 is arranged to extend toward the portions close to the ends 12b of the upper surface 12a of the stop portion 12 in the longitudinal direction (X1 in FIG. 4) thereof so that the ends 12b of the stop portion 12 in the longitudinal direction (X1 in FIG. 4) thereof can be further inhibited from upward deformation, whereby the fit portion 11 can be more effectively inhibited from slipping off the mounting hole 32b of the rotatable member 32 due to upward deformation of the ends 12b of the stop portion 12 in the longitudinal direction (X1 in FIG. 4) thereof. Further, the rib portion 13a is so provided on the longitudinal centerline of the stop portion 12 that the same is provided on the centers of the portions close to the longitudinal ends 12b of the stop portion 12, whereby the longitudinal ends 12b of the stop portion 12 can be uniformly inhibited from upward deformation.

According to this embodiment, the pull portion 13 is provided with the projecting portions 13b projecting from both side surfaces of the rib portion 13a in the short-side direction (Y1 in FIG. 4) of the stop portion 12 so that ends of the stop portion 12 in the short-side direction (Y1 in FIG. 4) can also be inhibited from upward deformation through the projecting portions 13b, whereby the fit portion 11 can be inhibited from slipping off the mounting hole 32b of the stand 30 due to upward deformation of the ends of the stop portion 12 in the short-side direction (Y1 in FIG. 4) thereof. Further, the projecting portions 13b are provided on the pull portion 13 in addition to the rib portion 13a to increase the bond area between the pull portion 13 and the stop portion 12, whereby tearing of the pull portion 13 can be suppressed when the fit portion 12 is fitted into the mounting hole 32b of the rotatable member 32 by pulling the pull portion 13 upward. In addition, the projecting portions 13b are provided on the centerline extending in the short-side direction of the stop portion 12 so that the projecting portions 13b projecting in the short-side direction are provided around the easily upwardly deformable center of the stop portion 12, whereby the ends of the stop portion 12 in the short-side direction can be further inhibited from upward deformation.

According to this embodiment, the recess portion 32c storing the outer upper surface 14b of the contact portion 14 is provided on the mounting hole 32b of the stand 30 so that the outer upper surface 14b of the contact portion 14 can be inhibited from observableness. In this case, the distance D (see FIG. 7) between the outer side surface 11a of the fit portion 11 and the outer side surface 14d of the contact portion 14 can be reduced by arranging the centerline L1 of the fit portion 11 at the interval S from the longitudinal centerline L2 of the contact portion 14 toward the surface (outer surface) of the stand 30. Thus, the quantity of deformation of the portion of the distance D located between the outer side surface 11a of the fit portion 11 and the outer side surface 14d of the contact portion 14 can be reduced when the contact portion 14 is deformed with respect to the centerline L1 of the fit portion 11 in a direction (R in FIG. 7) bending the outer upper surface 14b of the contact portion 14 downward. Consequently, the outer upper surface 14b of the contact portion 14 can be further inhibited from observableness through the outer surface of the rotatable member 32.

Although the present invention has been described and illustrated in detail, it is clearly understood that the same is by way of illustration and example only and is not to be taken by way of limitation, the spirit and scope of the present invention being limited only by the terms of the appended claims.

For example, while the stand mounted with the inventive antislip rubber members is applied to a liquid crystal television in the aforementioned embodiment, the present invention is not restricted to this but may alternatively be applied to a stand for a display, such as a plasma display panel (PDP), other than the liquid crystal television.

While both of the rib portion and the projecting portions are provided on the pull portion of the antislip rubber member in the aforementioned embodiment, the present invention is not restricted to this but only the rib portion may be provided on the pull portion of the antislip rubber member.

While the antislip rubber member is made of silicone rubber in the aforementioned embodiment, the present invention is not restricted to this but the antislip rubber member may alternatively be made of rubber other than the silicone rubber.

What is claimed is:

1. An antislip rubber member for a support, comprising:
    a fit portion fitted into a mounting hole of a support supporting a display;
    a stop portion preventing said fit portion from slipping off said mounting hole of said support;
    a pull portion pulled in a direction for fitting said fit portion into said mounting hole of said support thereby fitting said fit portion into said mounting hole of said support; and
    a contact portion coming into contact with a set surface thereby inhibiting said support supporting said display from misregistration, wherein
    said pull portion includes a rib portion, slender in plan view, arranged to extend in the longitudinal direction of said stop portion, and
    said rib portion having a vertical length larger than the vertical length of said stop portion.

2. The antislip rubber member for a support according to claim 1, wherein
    said rib portion of said pull portion is arranged to extend toward a portion close to a longitudinal end of the upper surface of said stop portion.

3. The antislip rubber member for a supporting according to claim 1, wherein
    said rib portion has a thickness smaller than the short-side width of said fit portion.

4. The antislip rubber member for a support according to claim 1, wherein
    said rib portion is provided on a centerline extending in the longitudinal direction of said stop portion.

5. The antislip rubber member for a support according to claim 1, wherein
    said pull portion further includes a projecting portion integrally provided with said rib portion to project from a side surface of said rib portion in the short-side direction of said stop portion in plan view.

6. The antislip rubber member for a support according to claim 5, wherein
    a pair of said projecting portions are provided on said pull portion to project from both side surfaces of said rib portion in the short-side direction of said stop portion.

7. The antislip rubber member for a support according to claim 5, wherein
    said projecting portion of said pull portion is provided on a centerline extending in the short-side direction of said stop portion.

8. The antislip rubber member according to claim 1, wherein
    said mounting hole of said support is provided with a recess portion partiality storing the upper surface of said contact portion, and
    said fit portion is so arranged as to locate the longitudinal centerline of said fit portion on a position separated from the longitudinal centerline of said contact portion at a prescribed interval toward the surface of said support in plan view.

9. An antislip rubber member for a support comprising a fit portion fitted into a mounting hole of a support supporting a liquid crystal display, a stop portion preventing said fit portion from slipping off said mounting hole of said support, a pull portion pulled in a direction for fitting said fit portion into said mounting hole of said support thereby fitting said fit portion into said mounting hole of said support and a contact portion coming into contact with a set surface thereby inhibiting said support supporting said liquid crystal television from misregistration, wherein
    said pull portion includes a rib portion, slender in plan view, arranged to extend toward a portion close to a longitudinal end of the upper surface of said stop portion,
    said pull portion includes a projecting portion integrally provided with said rib portion to project from a side surface of said rib portion in the short-side direction of said stop portion in plan view,
    said mounting hole of said support is provided with a recess portion partially storing the upper surface of said contact portion, and
    said fit portion is so arranged as to locate the longitudinal centerline of said fit portion on a position separated from the longitudinal centerline of said contact portion at a prescribed interval toward the surface of said support in plan view.

10. The antislip rubber member for a support according to claim 9, wherein said rib portion has a thickness smaller than the short-side width of said fit portion.

11. The antislip rubber member for a support according to claim 9, wherein said rib portion is provided on a centerline extending in the longitudinal direction of said stop portion.

12. The antislip rubber member for a support according to claim 9, wherein said rib portion has a vertical length larger than the vertical length of said stop portion.

13. The antislip rubber member for a support according to claim 9, wherein a pair of said projecting portions are provided on said pull portion to project from both side surfaces of said rib portion in the short-side direction of said stop portion.

14. The antislip rubber member for a support according to claim 9, wherein said projecting portion of said pull portion is provided on a centerline extending in the short-side direction of said stop portion.

* * * * *